(No Model.)

G. BAUSCH.
SPECTACLES.

No. 576,251. Patented Feb. 2, 1897.

WITNESSES:
H. E. Spencer
O. J. Breck

INVENTOR
George Bausch,
BY
N. Albertus West
ATTORNEYS.

UNITED STATES PATENT OFFICE.

GEORGE BAUSCH, OF SYRACUSE, NEW YORK.

SPECTACLES. REISSUED

SPECIFICATION forming part of Letters Patent No. 576,251, dated February 2, 1897.

Application filed May 28, 1896. Serial No. 593,409. (No model.)

*To all whom it may concern:*

Be it known that I, GEORGE BAUSCH, a citizen of the United States, and a resident of Syracuse, in the county of Onondaga and State of New York, have invented certain new and useful Improvements in Spectacles, of which the following is a specification.

My invention relates to an improvement in spectacles; and the invention consists in such construction of nose-guards independent of, or in connection with, the ordinary bridge which unites the lens-frames that the lenses may be brought nearer to or moved farther away from the eyes, or raised or lowered, as desired, regard being had to facial formation and to the proper arrangement of the axis of the lenses with the pupils of the eyes, and so that the weight of the spectacles may be made to be supported by the bridge wholly, partially, or not at all, according to the wish of the wearer.

Figure 1:
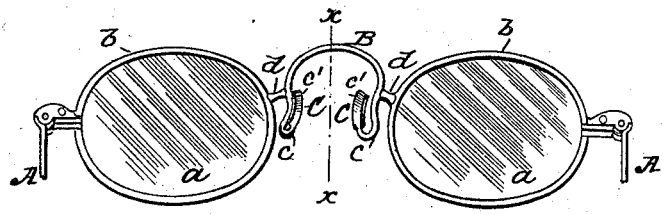
Figure 2:
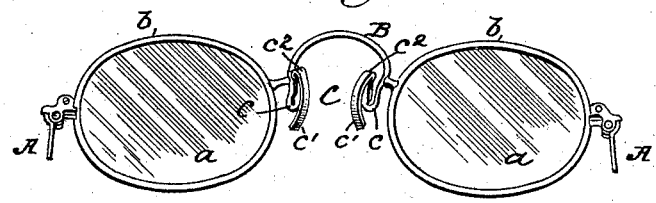
Figure 3:
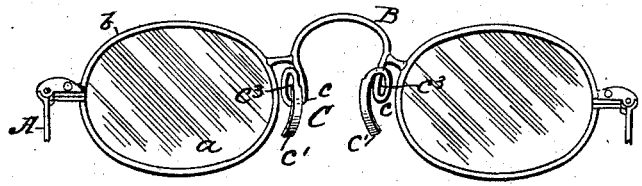
Figure 4:
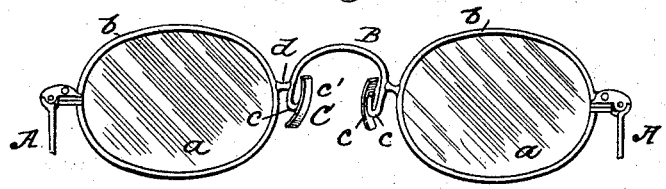
Figure 5:
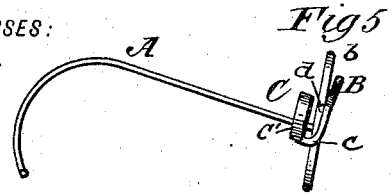

In the accompanying drawings, to which reference is made, and which form a part of this specification, Figure 1 is a perspective view of a pair of spectacles having my invention applied thereto. Figs. 2, 3, and 4 are like views, showing modifications; and Fig. 5 is a sectional elevation on line $x\,x$ of Fig. 1.

The holding of the spectacles upon the face of the wearer is effected by the temples A A, which may be straight or curved, the bridge B, and the nose-rests C C. All of these parts may be connected to the lenses $a\,a$ by means of suitable clamps, such as are in common use for frameless glasses, or by other appropriate means, or they may be connected to lens-frames $b\,b$.

The bridge B is a rigid but ductile piece of metal, preferably round untempered wire, connected rigidly, by soldering, welding, or brazing, with the two solid posts $d\,d$, which connects the bridge B to the lens-frames $b\,b$. The bridge B is not connected at its ends or terminals to the lens-frames $b\,b$, but the two ends of the wire which forms the bridge are extended down below the said posts $d\,d$, and said extended ends below said posts are each bent inward toward the face of the wearer, as shown at $c$, then upward to a point adjacent to the plane of, but inward from, the said posts, and the upwardly-projecting terminal sections are formed or provided with the nose-guards C, which are rigidly attached to the terminals of the bridge, and which are by said terminals offset inward from and are adjustable to or away from the plane of the lenses. The main faces $c'$ of the nose-guards C are of ductile metal, so that they, like the terminal sections of the bridge, may be bent by means of pliers to effect the proper fitting of the frames and the proper focal and pupilary adjustment of the lenses to the eyes of the wearer. The said terminal sections of the bridge B and the nose-guards may be of various forms. In Figs. 1 and 5 the main faces $c'$ of the guards are made integral with the metal of the bridge and project upward, while in Figs. 2 and 3 they project downward, a loop $c^3$ being formed in Fig. 3. In Fig. 4 the main nose-guards are made of separate pieces of metal and are soldered to the terminals of the bridge.

It will be understood that rubber, leather, cork, or other facing-strips may be applied to the contact-surfaces of the nose-rests, if desired.

Having thus described my invention, what I claim as new, and desire to secure by Letters Patent, is—

1. In a pair of spectacles having temples A, A, the bridge B of rigid ductile metal secured to the lens-frames $b\,b$, by rigid studs $d\,d$, and extended below said studs, the said extended ends of the bridge B being bent inward and upward and each provided with an inwardly offset nose-guard C; substantially as described.

2. In a pair of spectacles having temples A A and lens-frames $b\,b$, the combination therewith of the bridge B of rigid ductile metal soldered or otherwise secured to the posts $d\,d$, and extended below the posts, the said extended ends being bent inward and upward and the terminals thereof curved and flattened to form offset and adjustable nose-guards, substantially as described.

GEO. BAUSCH.

Witnesses:
 EDWARD HOMMEL,
 FRED F. MESMER.